(12) United States Patent
Narholz et al.

(10) Patent No.: US 9,316,444 B2
(45) Date of Patent: Apr. 19, 2016

(54) APPARATUS FOR CONVEYING AND PRE-HEATING A METAL CHARGE FOR A MELTING PLANT AND CONNECTED METHOD

(75) Inventors: Thomas Narholz, Feldmeilen (CH); Bernard Villemin, Eggenwil (CH)

(73) Assignee: Danieli & C. Officine Meccaniche SPA (IT)

( * ) Notice: Subject to any disclaimer, the term of this patent is extended or adjusted under 35 U.S.C. 154(b) by 375 days.

(21) Appl. No.: 13/993,011

(22) PCT Filed: Dec. 10, 2010

(86) PCT No.: PCT/IB2010/003207
§ 371 (c)(1),
(2), (4) Date: Jun. 10, 2013

(87) PCT Pub. No.: WO2012/076921
PCT Pub. Date: Jun. 14, 2012

(65) Prior Publication Data
US 2015/0308746 A1 Oct. 29, 2015

(51) Int. Cl.
*F27D 3/00* (2006.01)
*F27D 17/00* (2006.01)
*C21C 5/52* (2006.01)
(Continued)

(52) U.S. Cl.
CPC .............. *F27D 17/002* (2013.01); *C21B 11/00* (2013.01); *C21B 13/00* (2013.01); *C21C 5/52* (2013.01); *C21C 5/527* (2013.01); *C21C 5/565* (2013.01); *C22B 1/005* (2013.01); *F27D 13/00* (2013.01);
(Continued)

(58) Field of Classification Search
CPC ........ F27D 13/002; C21C 5/567; C22B 1/005
USPC ........................................... 266/901
See application file for complete search history.

(56) References Cited

U.S. PATENT DOCUMENTS 3,301,662 A   1/1967 Ban
4,083,675 A   4/1978 Fellnor et al.
(Continued)

FOREIGN PATENT DOCUMENTS

CN    1086894      5/1994
DE    102008037111  2/2010
(Continued)

OTHER PUBLICATIONS

International Search from Application No. PCT/IB2010/003207 mailed Sep. 27, 2011.
(Continued)

*Primary Examiner* — Scott Kastler
(74) *Attorney, Agent, or Firm* — Calfee, Halter & Griswold LLP

(57) ABSTRACT

Apparatus for continuously conveying and pre-heating a metal charge inside a container of a melting plant, comprising at least a conveyor channel, having walls to convey the metal charge, and at least a hood defining a conveyor tunnel and/or an expansion chamber. The hood is disposed above the conveyor channel for the transit of at least part of the fumes exiting from the container, and the conveyor channel cooperates with apertures to discharge the fumes. The apertures cooperate with at least a fume diverting channel defining at least a first expansion compartment, located substantially vertical or sub-vertical, connected both to the apertures and also to at least a channel to take in the fumes.

12 Claims, 4 Drawing Sheets

(51) Int. Cl.
*C21C 5/56* (2006.01)
*C21B 11/00* (2006.01)
*C21B 13/00* (2006.01)
*C22B 1/00* (2006.01)
*F27D 13/00* (2006.01)

(52) U.S. Cl.
CPC ........... *C21C 2100/02* (2013.01); *Y02P 10/216* (2015.11)

(56) References Cited

U.S. PATENT DOCUMENTS

| | | | |
|---|---|---|---|
| 4,135,702 A | | 1/1979 | Venetta et al. |
| 5,647,288 A * | | 7/1997 | Matsumoto et al. .......... 110/228 |
| 2010/0028821 A1 | | 2/2010 | Gavenda et al. |
| 2013/0328251 A1* | | 12/2013 | Narholz et al. ................. 266/44 |
| 2014/0010255 A1 | | 1/2014 | Narholz et al. |

FOREIGN PATENT DOCUMENTS

| | | |
|---|---|---|
| IT | 1359081 | 3/2005 |
| JP | 8157930 A | 6/1996 |
| JP | 08285477 | 11/1996 |
| JP | 09159376 A | 6/1997 |
| WO | 9409332 | 4/1994 |
| WO | 2006089897 | 2/2006 |
| WO | 2006089867 | 8/2006 |
| WO | 2011091685 A1 | 8/2011 |

OTHER PUBLICATIONS

Written Opinion from Application No. PCT/IB2010/003207 mailed Sep. 27, 2011.
Response to Office Action from U.S. Appl. No. 13/992,956 dated Aug. 19, 2015.
Office Action from U.S. Appl. No. 13/992,956 dated Sep. 24, 2015.
Office Action from U.S. Appl. No. 13/992,985 dated May 22, 2015.
Response to Office Action from U.S. Appl. No. 13/992,985 dated Sep. 3, 2015.
Office Action from Chinese Application No. 201080071198.2 dated Nov. 19, 2014.
Office Action from Mexican Patent Application No. MX/A/2013/006397 dated Jan. 7, 2015.
International Search Report from Application No. PCT/IB2010/003197 mailed Mar. 28, 2011.
Written Opinion from Application No. PCT/IB2010/003197 mailed Mar. 28, 2011.
International Search Report from Application No. PCT/IB2010/003206 mailed Aug. 25, 2011.
Written Opinion from Application No. PCT/IB2010/003206 mailed Aug. 25, 2011.
Office Action from U.S. Appl. No. 13/992,985 dated Dec. 18, 2014.
Response to Office Action from U.S. Appl. No. 13/992,985 dated Mar. 11, 2015.
Office Action from U.S. Appl. No. 13/992,956 dated Mar. 19, 2015.
Notice of Preliminary Rejection From Korean Patent Application No. 9-5-2014-044796562 (including English Translation), mailed Jun. 27, 2014.

* cited by examiner

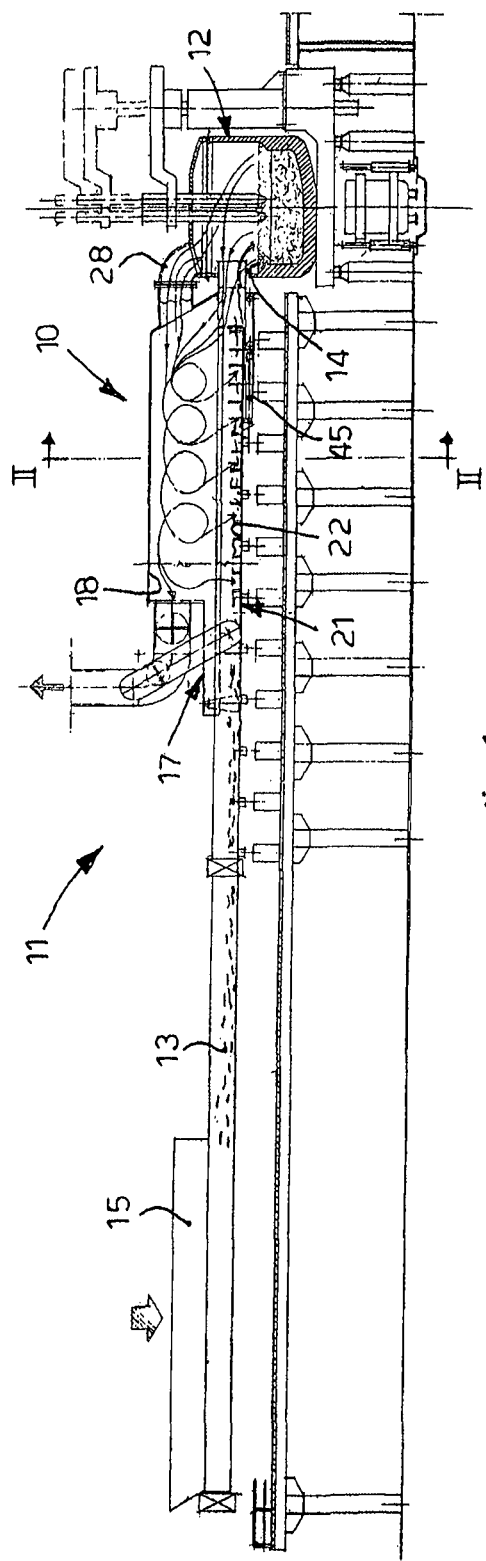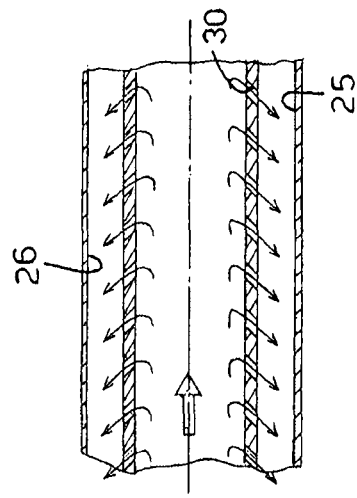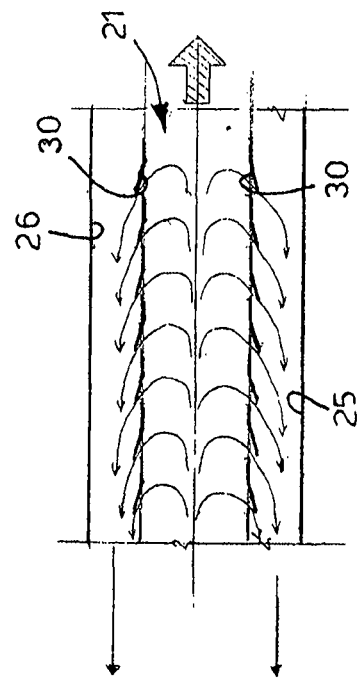

APPARATUS FOR CONVEYING AND PRE-HEATING A METAL CHARGE FOR A MELTING PLANT AND CONNECTED METHOD

CROSS-REFERENCE TO RELATED APPLICATION

This application is the U.S. national phase entry of PCT/IB2010/003207, with an international filing date of 10 Dec. 2010, the entire disclosure of which is fully incorporated herein by reference.

FIELD OF THE INVENTION

The present invention concerns an apparatus, and the connected method, for continuously pre-heating and conveying a metal charge, such as iron scrap, hot or cold sponge iron (DRI), pig iron or other, inside a container, advantageously a melting furnace, for example an electric arc furnace.

BACKGROUND OF THE INVENTION

Apparatuses of the vibratory or oscillating type are known, to convey a metal charge to a container of a melting plant, advantageously a melting furnace.

Such known apparatuses provide a segment long enough to pre-heat the metal charge sufficiently, by means of fumes exiting from the furnace, while it is being conveyed.

Each of the known apparatuses comprises a bearing structure on which a conveyor channel is mounted, having a substantially U-shaped cross section or similar.

At least part of the conveyor channel is covered at the upper part by one or more hoods that define a tunnel into which the fumes exiting from the melting furnace flow, in the direction opposite to that in which the metal charge advances, at the same time carrying out the pre-heating.

The conveyor channel is provided along the lateral walls with apertures communicating with suction channels, directly connected to fume suction means.

The fume suction means create a depression inside the suction channels and, through the apertures present in the lateral walls of the conveyor channel, take in the fumes. The hot fumes pass through the metal charge and heat it.

As the fumes pass through the metal charge, also due to the high suction capacity of the suction means, a considerable quantity of small metal fragments, for example metal chip, are taken in through the suction means.

As a consequence, not all the metal charge is carried into the melting furnace and most of the fragments stop inside the suction channels, obstructing the passage of the fumes and altering the suction conditions.

Furthermore, to this we must add the need for frequent maintenance operations with consequent downtimes of the plant, in order to remove from the suction channels the fragments that are deposited in them.

Applicant has therefore set himself the purpose of eliminating the passage of thin charge material, such as for example metal chip, in order to limit the maintenance interventions both in the suction channels and in the suction means.

Another purpose is to achieve an apparatus that has limited costs and times of management and maintenance compared with the state of the art.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

The present invention is applied to apparatuses which, above the conveyor channel, have at least a hood able to define either a fume conveyor tunnel and/or a fume expansion chamber.

In accordance with these purposes, an apparatus for conveying a pre-heated metal charge inside a container of a melting plant comprises at least a conveyor channel, in which the metal charge is able to advance continuously, and a hood that is disposed above the conveyor channel so as to define with it the tunnel and/or expansion chamber inside which at least part of the fumes exiting from the container are made to flow in counter-flow.

The fumes pass through the metal charge, heat it, and exit from apertures cooperating with the walls of the conveyor channel that convey the metal charge.

According to a characteristic feature of the present invention, said apertures cooperate with at least a fume diverter channel, disposed substantially vertical or sub-vertical.

The fume diverter channel is connected both to the apertures and also to at least a suction channel which is disposed downstream of the fume diverter channel. Both the fume diverter channel and also, according to a variant, the suction channel, define at least a fume expansion compartment.

According to the invention the fumes are constrained to follow a labyrinth-type path, first passing through the apertures cooperating with the conveyor walls, then the fume diverter channel where a first, considerable expansion occurs, and then they are expelled by the suction means. This obligatory path makes a considerable part of the particles carried in suspension fall onto the bottom of the fume diverter channel.

According to a first formulation, the fume diverter channel is defined by the conveyor walls, which cooperate with lateral walls of the conveyor channel disposed outside the conveyor walls.

According to a variant, the lateral walls and the conveyor walls are substantially parallel to each other.

According to another variant, the lateral walls extend divergent toward the upper part of the hood.

According to another variant, the divergence of the lateral walls is with respect to the conveyor walls.

In this way the lateral walls and the conveyor walls define a divergent fume diverter channel which determines an expansion of the fumes and promotes the precipitation of the particles.

The present invention also concerns the relative method to convey and pre-heat the metal charge inside the container of a melting plant.

The method comprises at least a step of continuously conveying the metal charge inside the container, a step of conveying the fumes exiting from the container inside a tunnel and/or an expansion chamber, disposed above the conveyor channel, a step where the fumes pass through the metal charge, due to the effect of a suction action exerted by suction means located downstream, and a step of discharging the fumes through apertures made in the conveyor walls.

According to one feature of the invention, the fume discharge step provides that the fumes are made to pass through at least a fume diverter channel which cooperates on one side with apertures present in the conveyor channel and on the other side with at least a suction channel.

According to another feature, the fumes in the diverter channel are subjected to expansion.

BRIEF DESCRIPTION OF THE DRAWINGS

These and other characteristics of the present invention will become apparent from the following description of a preferential form of embodiment, given as a non-restrictive example with reference to the attached drawings wherein:

FIG. 1 is a schematic lateral view of a melting plant to which the conveying and pre-heating apparatus according to the present invention is applied;

FIG. 5 is a schematic plane view of a detail in FIG. 4;

FIG. 6 shows a variant of FIG. 4;

Figure 2:
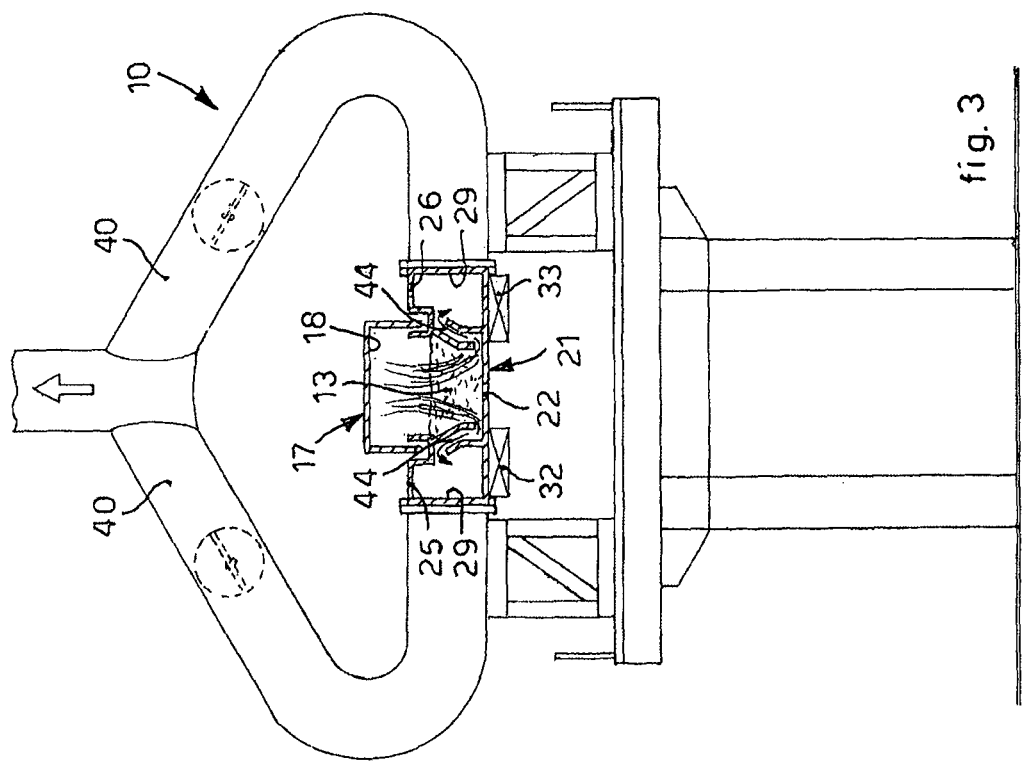
FIG. 2 is a section view from II to II of FIG. 1.

To facilitate comprehension, the same reference numbers have been used, where possible, to identify common elements in the drawings that are substantially identical. It is understood that elements and characteristics of one form of embodiment can conveniently be incorporated into other forms of embodiment without further clarifications.

DETAILED DESCRIPTION OF A PREFERENTIAL FORM OF EMBODIMENT

With reference to the attached drawings, the reference number 10 denotes in its entirety a conveying and pre-heating apparatus according to the present invention.

The apparatus 10 (FIG. 1) is installed in a melting plant 11, of a substantially known type that comprises a melting furnace 12, for example of the electric arc type, fed laterally through a loading aperture 14, with a metal charge 13 transported by the apparatus 10.

In this case, the plant 10 comprises a loading module 15, to load the metal charge 13 into a conveyor channel 21 of the apparatus 10.

In the conveyor channel 21 the metal charge 13 is preheated and introduced into the melting furnace 12.

A vibration device 41 of a known type is associated with the conveyor channel 21 and, by means of a vibratory or oscillatory movement in a longitudinal direction, makes the metal charge 13 advance inside the melting furnace 12.

The apparatus 10 also comprises one or more hoods 17, disposed above the conveyor channel 21.

The hood 17 (FIG. 2) defines an expansion chamber 18 that extends above the metal charge 13 and is suitable to slow down the fumes and keep them inside it for a desired time before they impact against the metal charge 13. The minimum time is necessary to complete the combustion of non-combusted gases present in the fumes and to promote the deposit of particulate and powders.

The present invention is also applicable when the hood 17 (FIG. 3) is disposed immediately above the metal charge 13 to define a tunnel 18 for the passage of the fumes, so that the metal charge 13, or at least the surface layers thereof, is hit directly by the hot fumes arriving from the melting furnace 12.

A connection pipe 28 is associated with the apparatus 10 (FIG. 1), which connects the fourth hole of the melting furnace 12 with the expansion chamber 18 and, when the loading aperture 14 is closed, allows to convey almost all the fumes produced inside the melting furnace 12 directly inside the expansion chamber 18.

Figure 3:
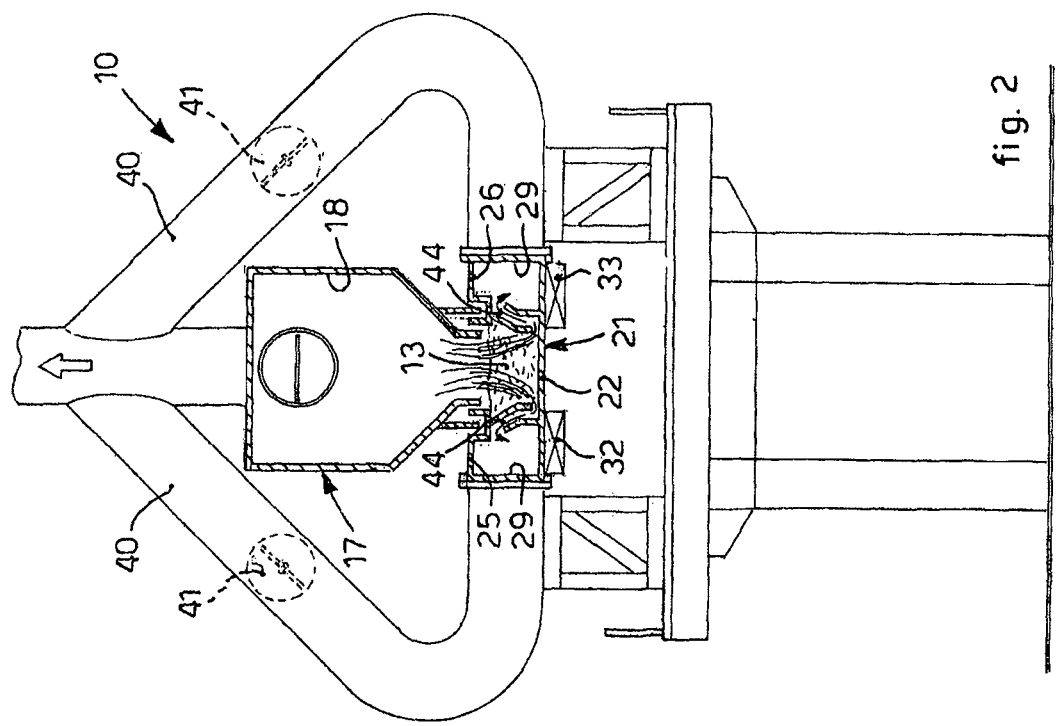
FIG. 3 shows a variant of FIG. 2.

The conveyor channel 21 comprises a bottom wall 22, substantially horizontal, and two lateral walls 23 and 24 which define in this case a substantially U-shaped cross section (FIGS. 2 and 3).

Along the whole length of the conveyor channel 21, at the side of the lateral walls 23 and 24 of the conveyor channel 21, suction pipes 25 and 26 are provided, connected to fume discharge pipes 40.

The discharge pipes 40 are connected to fume suction and filtering plants, of a known type, and have valve members 41 to regulate the fume suction level.

Figure 4:
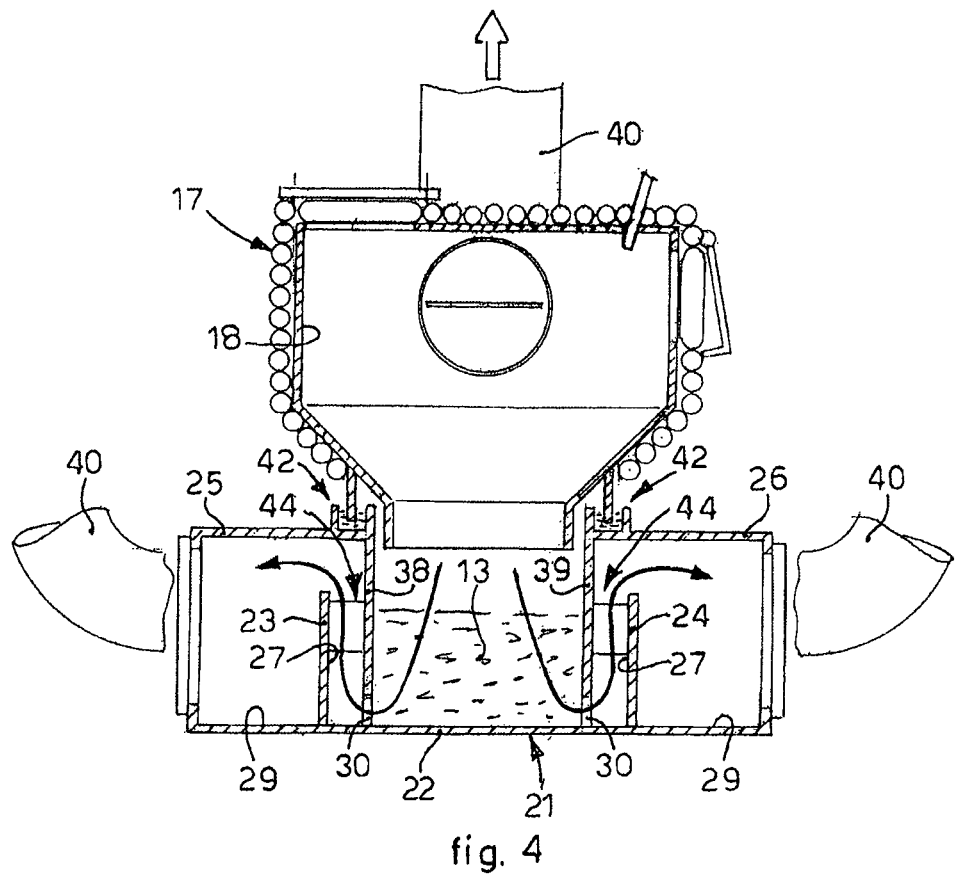
FIG. 4 is an enlarged view of FIG. 2 according to a variant.

In the form of embodiment shown in FIGS. 2, 3 and 4, the suction pipes 25 and 26 are made in a single piece with the conveyor channel 21 and are provided with vibration members 32 and 33 (FIG. 3) so as to prevent, or at least limit, the sedimentation of powders or other impurities inside them.

In other forms of embodiment (FIGS. 7 and 8), the conveyor channel 21 is made as a separate element with respect to the suction channels 25 and 26, and sealing members 42 of a hydraulic and substantially known type are interposed between the conveyor channel 21 and the suction channels 25 and 26 to guarantee the fumes are sealed.

The suction channels 25 and 26 are also provided with inspection doors that allow maintenance.

The conveyor channel 21, advantageously for the whole of its length, has means able to oblige the fumes to follow a labyrinth-type path in order to promote the precipitation of powders, particles and smaller fragments of metal charge, such as chip deriving from metal working, onto the metal charge 13 as it advances, and prevent them from being transported inside the suction channels 25 and 26 and into the discharge pipes 40.

The above-mentioned means comprise conveyor walls 38 and 39 to convey the metal charge 13, and lateral walls 23 and 24 to convey the fumes toward the suction channels 25 and 26, which are associated with the bottom wall 22 of the conveyor channel 21.

The lateral walls 23, 24 and the conveyor walls 38, 39 define a fume diverter channel 44 through which the fumes are obliged to pass before being introduced into the suction channels 25, 26.

Each fume diverter channel 44 defines a first expansion compartment 27 of the fumes exiting from the apertures 30 in which they are subjected to expansion and then precipitation of the particles onto the bottom of the diverter channel 44.

In the same way the suction channels 25, 26 each define a second expansion compartment 29 inside which there is another expansion of the gases and then precipitation of the particles onto the bottom.

Figure 7:
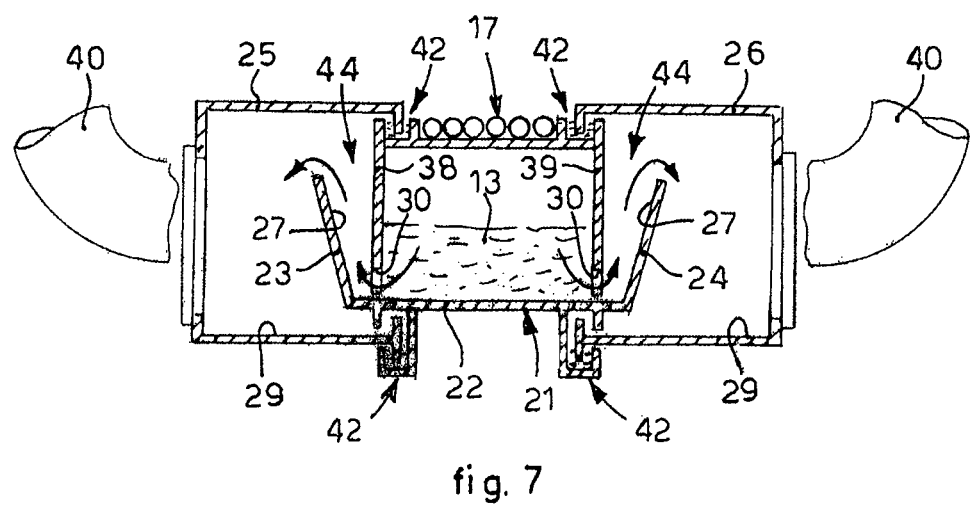
FIG. 7 shows a first variant of FIG. 4.

With reference to FIG. 7, the conveyor walls 38 and 39 are associated with the hood 17 above the conveyor channel 21, while in other forms of embodiment (FIGS. 4 and 8) the conveyor walls 38 and 39 are directly associated with the conveyor channel 21.

The conveyor walls 38 and 39 (FIGS. 4 and 8) extend toward the bottom wall 22 of the conveyor channel 21, and define with them the bottom wall 22, for at least a good part of the extension of the expansion chamber 18, respective longitudinal apertures 30 through which the fumes can pass.

The conveyor walls 38 and 39, in some forms of embodiment (FIG. 4), are substantially parallel to the lateral walls 23 and 24.

To prevent blockages of the apertures 30 due to jamming of parts of the metal charge 13, in other forms of embodiment (FIG. 7), the conveyor walls 38 and 39 extend as far as and are associated with the bottom wall 22. In proximity with the latter, they have apertures 30 made at regular intervals and conformed as shown in FIG. 5 or, in another form of embodiment, as in FIG. 6.

The apertures 30 can also be governed by means that regulate their opening gap so as to control the fume suction level.

In other forms of embodiment, instead of being substantially vertical, the conveyor walls 38 and 39 can be converging toward the bottom wall 22 of the conveyor channel 21. This form of embodiment is advantageous in that the fumes present in the expansion chamber 18, due to the effect of the suction exerted by the suction channels 25 and 26 and the effect of the convergence of the conveyor walls 38 and 39, are obliged to converge toward the central part of the bottom wall 22 of the conveyor channel 21, and to heat substantially all the metal charge 13.

By suitably controlling the suction level of the suction channels 25 and 26, it is possible to control the discharge of the fumes and prevent particles of a certain weight from being carried vertically in suspension along the diverter channel 44 defined by the lateral walls 23 and 24 and conveyor walls 38 and 39.

The particles, even if partly carried in suspension, cannot overcome the lateral walls 23 and 24, and fall onto the bottom of the diverter channel 44 which subsequently discharges the particles inside the melting furnace 12.

In the case shown in FIG. 7, the conveyor walls 38 and 39 extend substantially vertical while the lateral walls 23 and 24 of the conveyor channel 21 extend toward the upper part of the suction channels 25, 26, inclined toward the outside. The conveyor walls 38 and 39 and the lateral walls 23 and 24 define a divergent diverter channel 44 through which the fumes are discharged.

The function of the divergent diverter channel 44 is to slow down the speed of the fumes as they are discharged so as to further reduce the quantity of particles that are carried in vertical suspension.

Figure 8:
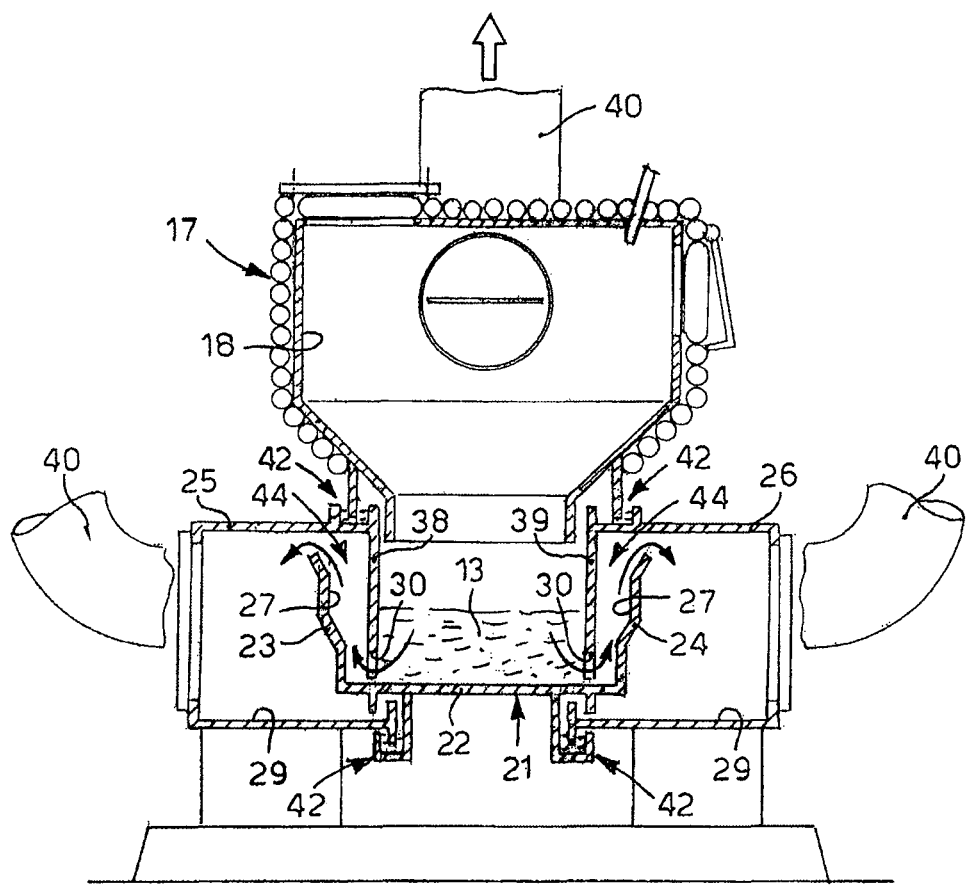
FIG. 8 shows a second variant of FIG. 4.

In another form of embodiment, the lateral walls 23 and 24 are conformed as shown in FIG. 8, that is, they each comprise both vertical walls and walls inclined toward the outside so as to induce turbulence in the fumes that tend to deposit on the conveyor channel 21 the particles remaining substantially in suspension.

In this case, moreover, the suction channels 25 and 26 are attached to a support base.

It is clear that modifications and/or additions of parts may be made to the apparatus as described heretofore, without departing from the field and scope of the present invention.

It is also clear that, although the present invention has been described with reference to some specific examples, a person of skill in the art shall certainly be able to achieve many other equivalent forms of apparatus, having the characteristics as set forth in the claims and hence all coming within the field of protection defined thereby.

The invention claimed is:

1. An apparatus for continuously conveying and pre-heating a metal charge inside a container of a melting plant, comprising:
    a container capable of advancing a metal charge;
    a conveyor channel in fluid communication with said container and having conveyor walls and lateral walls and a bottom wall that define a substantially U-shaped cross section,
    a hood at least partially disposed above said conveyor channel and having a tunnel wherein at least part of the fumes exiting from the metal charge in said container advance into said hood,
    at least one fume discharge aperture disposed within said conveyor walls,
    suction channels disposed within said lateral walls and running substantially the length of the conveyor channel,
    a fume diverter channel defined by said conveyor walls in cooperation with said lateral walls and capable of passing fumes into said suction channels, and
    a first expansion compartment connected to said at least one fume discharge aperture and connected to said suction channels;
    wherein the first expansion compartment is disposed above the conveyor channel.

2. The apparatus of claim 1 further comprising a second expansion chamber defined by said suction channels and capable of further expanding the fumes.

3. The apparatus of claim 2 wherein said fume diverter channel and said suction channels extend longitudinally for the whole length of the conveyor channel.

4. The apparatus of claim 3 wherein said lateral walls are disposed outside said conveyor walls.

5. The apparatus of claim 4 wherein said lateral walls are substantially parallel to said conveyor walls.

6. The apparatus of claim 5 wherein said lateral walls extend toward said hood.

7. The apparatus of claim 6 wherein said lateral walls are divergent with respect to said conveyor walls.

8. The apparatus of claim 7 wherein said conveyor walls define at least part of said hood.

9. Method to convey and pre-heat a metal charge inside a container of a melting plant, comprising the step of:
    conveying a metal charge by a conveyor channel having conveyor walls and a bottom wall and two lateral walls defining a substantially U-shaped cross section,
    conveying fumes exiting from container to a hood disposed above said conveyor channel and including an expansion chamber, wherein the expansion chamber is disposed above the conveyor channel,
    passing the fumes through said metal charge,
    expanding said fumes in said expansion chamber and
    discharging said fumes through apertures disposed in said conveyor walls, wherein said discharging step further comprises passing said fumes through a fume diverter channel defined by said conveyor walls together with said lateral walls and introducing said fumes into suction channels provided along the length of the conveyor channel at the side of said lateral walls.

10. The method of claim 9 further comprising the step of subjecting said fumes to another expansion inside said suction channels.

11. The method of claim 10 further comprising the step of continuously discharging precipitate formed on the bottom of said fume diverter channel.

12. Method to convey and pre-heat a metal charge inside a container of a melting plant, comprising the step of:
    conveying a metal charge by a conveyor channel having conveyor walls and a bottom wall and two lateral walls defining a substantially U-shaped cross section;
    conveying fumes exiting from container to a hood disposed above said conveyor channel and including an expansion chamber;
    passing the fumes through said metal charge;
    expanding said fumes in said expansion chamber;
    discharging said fumes through apertures disposed in said conveyor walls, wherein said discharging step further comprises passing said fumes through a fume diverter channel defined by said conveyor walls together with said lateral walls and introducing said fumes into suction channels provided along the length of the conveyor channel at the side of said lateral walls;

continuously discharging precipitate formed on the bottom of said fume diverter channel.

\* \* \* \* \*